United States Patent
Gianchandani et al.

(10) Patent No.: US 7,073,938 B2
(45) Date of Patent: Jul. 11, 2006

(54) MICROMACHINED ARRAYED THERMAL PROBE APPARATUS, SYSTEM FOR THERMAL SCANNING A SAMPLE IN A CONTACT MODE AND CANTILEVERED REFERENCE PROBE FOR USE THEREIN

(75) Inventors: Yogesh B. Gianchandani, Ann Arbor, MI (US); Shamus P. McNamara, Ann Arbor, MI (US); Joohyung Lee, Madison, WI (US); Amar Basu, Troy, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/760,884

(22) Filed: Jan. 19, 2004

(65) Prior Publication Data

US 2004/0202226 A1    Oct. 14, 2004

Related U.S. Application Data

(63) Continuation-in-part of application No. 10/001,919, filed on Oct. 31, 2001, now Pat. No. 6,692,145.

(51) Int. Cl.
*G01K 7/00*    (2006.01)
(52) U.S. Cl. ...................... 374/185; 374/167
(58) Field of Classification Search ............... 374/185, 374/112, 137, 167, 113, 114, 164, 166, 183; 338/28–30, 229
See application file for complete search history.

(56) References Cited

U.S. PATENT DOCUMENTS

| | | | |
|---|---|---|---|
| 3,531,990 A | 10/1970 | Shinskey | |
| 3,683,671 A | 8/1972 | Van Swaay | |
| 3,688,581 A | 9/1972 | Le Quernec | |
| 3,852,570 A | 12/1974 | Tyler | |
| 4,103,275 A | 7/1978 | Diehl et al. | |
| 4,143,549 A | 3/1979 | Koehler | |
| 4,413,917 A | 11/1983 | Cooper | |
| 5,051,379 A | 9/1991 | Bayer et al. | |
| 5,181,007 A | 1/1993 | Friese et al. | |
| 5,347,226 A | 9/1994 | Bachmann et al. | |
| 5,356,218 A | 10/1994 | Hopson et al. | |

(Continued)

OTHER PUBLICATIONS

Hiroshi, Ito, Chemically Amplified Resists: Past, Present and Future, SPIE, vol. 3678, 1999, pp. 2-12.

(Continued)

*Primary Examiner*—Diego Gutierrez
*Assistant Examiner*—Mirellys Jagan
(74) *Attorney, Agent, or Firm*—Brooks Kushman P.C.

(57) ABSTRACT

A relatively simple and inexpensive micromachined arrayed thermal probe apparatus, system for thermal scanning a sample in a contact mode and cantilevered reference probe for use therein can be used for a variety of microscopy and microcalorimetry applications ranging from the monitoring of processes in semiconductor manufacturing to the characterization of nano-scale materials, imaging of biological cells, and even data storage. Probes are designed to have very high thermal isolation and high mechanical compliance, providing advantages in both performance and ease of operation. In particular, an array of probes can be used for high throughput contact mode scanning of soft samples without mechanical feedback, and can, therefore, be used in wide arrays for high-speed measurements over large sample surfaces. The probes are preferably manufactured by a photolithographic fabrication process, which permits large numbers of probes to be made in a uniform and reproducible manner at low cost.

16 Claims, 2 Drawing Sheets

U.S. PATENT DOCUMENTS

| | | | |
|---|---|---|---|
| 5,388,323 | A | 2/1995 | Hopson et al. |
| 5,410,291 | A | 4/1995 | Kuzoaka |
| 5,411,600 | A | 5/1995 | Rimai et al. |
| 5,441,343 | A | 8/1995 | Pylkki et al. |
| 5,475,318 | A | 12/1995 | Marcus et al. |
| 5,574,279 | A * | 11/1996 | Ikeda et al. ............... 250/306 |
| 5,751,686 | A * | 5/1998 | Kuroda et al. ............. 369/126 |
| 5,753,911 | A | 5/1998 | Yasuda et al. |
| 5,772,325 | A | 6/1998 | Hopson et al. |
| 5,823,680 | A | 10/1998 | Kato et al. |
| 5,923,637 | A | 7/1999 | Shimada et al. |
| 5,929,438 | A * | 7/1999 | Suzuki et al. ............... 250/306 |
| 5,936,237 | A | 8/1999 | Van Der Weide |
| 5,976,390 | A | 11/1999 | Muramatsu |
| 6,019,505 | A | 2/2000 | Bonne et al. |
| 6,064,201 | A | 5/2000 | Cha et al. |
| 6,066,265 | A * | 5/2000 | Galvin et al. ................. 216/2 |
| 6,095,679 | A | 8/2000 | Hammiche et al. |
| 6,337,477 | B1 * | 1/2002 | Shimada et al. ............ 250/216 |
| 6,351,030 | B1 | 2/2002 | Havens et al. |
| 6,357,279 | B1 | 3/2002 | Willis |
| 6,406,181 | B1 | 6/2002 | Mueller et al. |
| 6,520,778 | B1 | 2/2003 | Eldridge et al. |
| 6,552,339 | B1 | 4/2003 | Gupta et al. |
| 6,692,145 | B1 * | 2/2004 | Gianchandani et al. ..... 374/185 |
| 2002/0008530 | A1 | 1/2002 | Kim et al. |
| 2002/0079445 | A1 | 6/2002 | Hantschel et al. |
| 2002/0110177 | A1 * | 8/2002 | Nakayama et al. ........... 374/44 |
| 2002/0153911 | A1 | 10/2002 | Cho et al. |
| 2003/0081651 | A1 | 5/2003 | Gianchandani et al. |
| 2003/0112844 | A1 | 6/2003 | Cordes et al. |
| 2003/0169798 | A1 | 9/2003 | Cordes et al. |
| 2004/0119490 | A1 * | 6/2004 | Liu et al. .................... 324/765 |

OTHER PUBLICATIONS

Majumdar, A., Scanning Thermal Microscopy, Annual Review Material Science, vol. 29, 1999, pp. 505-585.

Vettiger, P., et al., The Millipede—More Than One Thousand Tips For Future AFM Data Storage, IBM J. Res. Develop., vol. 44, No. 3, May 2000, pp. 323-340.

Wu, Julius J., Design, Fabrication and Testing of Polyimide MEMS For Scanning Thermal Microscopy, Master of Science thesis, Dept. of Electrical & Computer Eng., University of Wisconsin, Madison, 1999, pp. 1-54.

Li, M.H., et al., High Performance Scanning Thermal Probe Using A Low Temperature Polyimide-Based Micromachining Process, IEEE Int. Conf. on Micro Electro Mechanical Systems (MEMS '00), Miyazaki, Japan, Jan. 2000.

Li, Mo-Huang, et al., Microcalorimetry Applications of A Surface Micromachined Bolometer-Type Thermal Probe, J. Vac. Sci. Technol. B, vol. 18, No. 6, Nov./Dec. 2000, published online Dec. 6, 2000.

Li, Mo-Huang, et al., Surface Micromachined Polyimide Scanning Thermocouple Probes, J. of Microelectromechanical Systems, vol. 10, No. 1, Mar. 2001.

Ocola, L.E., Latent Image Formation: Nanoscale Topography and Colorimetric Measurments in Chemically Amplified Resists, J. Vac. Sci. Techn. B., vol. 14, No. 6, Nov./Dec. 1996, pp. 3974-3979.

Williams, C.C., et al., Scanning Thermal Profiler, Appl. Phys. Lett., vol. 49, 1986, pp. 157.

Pollock, H.M., et al., Micro-Thermal Analysis: Techniques And Applications, J. Phys. D: Appl. Phys. vol. 34, 2001, pp. 23-53.

Minne, S.C., et al., Automated Parallel High-Speed Atomic Force Microscoy, Appl. Physics Letter, vol. 72, No. 18, May 4, 1998, pp. 2340-2342.

Vettiger, P., et al., The Millipede—More Than One Thousand Tips For Future AFM Data Storage, IBMJ of Res. and Dev., vol. 44, May 3, 2000, pp. 323-340.

Akiyama, T., et al., Integrated Atomi Force Microscoy Array Probe With Metal-Oxide_Semiconductor Field Effect Transistor Stress Sensor, Thermal Bimorph Actuator, And On-Chip Complementary Metal-Oxide-Semiconductor Electronics, J. Vac. Sci. Technol. B: Microelectronics And Nanometer Structures, vol. 18, 2000, pp. 2669-2675.

Lee, Dong-Weon, et al., Microprobe Array With Electrical Interconnection For Thermal Imaging And Data Storage, Journal of Microelectromechanical System, vol. 11, No. 3, Jun. 2002, pp. 215-221.

Miller, Scott A., et al., Scaling Torsional Cantilevers For Scanning Probe Microscope Arrays: Theory And Experiment, Proc. Proc. of The Transducers 1997 Workshop, Chicago, Il, Jun. 16-19, 1997 pp. 455-458.

Lange, D., et al., Parallel Scanning AFM With On-Chip Circuitry In CMOS Technology.

Li, M.H., et al., Applications Of A Low Contact Force Polyimide Shank Bolometer Probe For Chemical And Biological Diagnostics, Sensors and Actuators A, Physical, vol. 104, 2003, pp. 236-245.

* cited by examiner

MICROMACHINED ARRAYED THERMAL PROBE APPARATUS, SYSTEM FOR THERMAL SCANNING A SAMPLE IN A CONTACT MODE AND CANTILEVERED REFERENCE PROBE FOR USE THEREIN

CROSS-REFERENCE TO RELATED APPLICATION

This application is a continuation-in-part of U.S. application Ser. No. 10/001,919, filed Oct. 31, 2001, now U.S. Pat. No. 6,692,145.

BACKGROUND OF THE INVENTION

1. Field of the Invention

This invention relates to micromachined arrayed thermal probe apparatus, systems for thermal scanning a sample in a contact mode and cantilevered reference probes for use therein.

2. Background Art

The following references relate to the present application and are referenced herein by their reference number:

[1] C. C. Williams et al., "Scanning Thermal Profiler," APPL. PHYS. LETT., Vol. 49, pp. 157, 1986.

[2] H. M. Pollock et al., "Micro-Thermal Analysis: Techniques and Applications," J. PHYS. D: APPL. PHYS., Vol. 34, pp. 23–53, 2001.

[3] S. C. Minne et al., "Automated Parallel High-Speed Atomic Force Microscopy," APPL. PHYSICS LETTERS, Vol. 72, pp. 2340, 1998.

[4] P. Vettiger et al., "'Millipede'—More Than One Thousand Tips for Future AFM Data Storage," IBM J. OF RES. AND DEV., Vol. 44, pp. 323–340, 2000.

[5] T. Akiyama et al., "Integrated Atomic Force Microscopy Array Probe With Metal-Oxide-Semiconductor Field Effect Transistor Stress Sensor, Thermal Bimorph Actuator, and On-Chip Complementary Metal-Oxide-Semiconductor Electronics," J. OF VACUUM SCIENCE AND TECHNOLOGY B: MICROELECTRONICS AND NANOMETER STRUCTURES, Vol. 18, pp. 2669–2675, 2000.

[6] D. W. Lee et al., "Microprobe Array With Electrical Interconnection for Thermal Imaging and Data Storage," J. OF MICROELECTROMECH. SYS., Vol. 11, pp. 215–221, 2002.

[7] S. A. Miller et al.,. "Scaling Torsional Cantilevers for Scanning Probe Microscope Arrays: Theory and Experiment," PROC. OF THE TRANSDUCERS 1997 WORKSHOP, 1997, Chicago, Ill., pp. 455–458.

[8] D. Lange et al., "Parallel Scanning AFM With On-Chip Circuitry in CMOS Technology, " PROC. OF THE INTL. CONF. ON MEMS, 1999, Orlando, Fla., pp. 447–452.

[9] M. H. Li et al., "Applications of a Low Contact Force Polyimide Shank Bolometer Probe for Chemical and Biological Diagnostics," SENSORS AND ACTUATORS A (PHYSICAL), Vol. 104, pp. 236–245, 2003.

First introduced in 1986 [1], scanning thermal microscopy (SThM) has found a unique place among the several techniques of high resolution scanning microscopy. It permits mapping of topography, temperature, thermal conductivity, thermal capacitance, and performing microcalorimetry with sub-100 nm spatial resolution [2]. The scanning probe has a thermal sensor (typically a bolometer) at a sharp tip located at the end of a cantilever. Scanning is best performed with the probe in contact with the sample to eliminate the high thermal resistance of an air gap, but this conventionally requires a mechanical feedback loop to prevent the probe from scratching the sample. As in atomic force microscopes, the contact force is sensed by measuring probe deflection with a reflected laser. The desire to increase throughput in scanning microscopy (both SThM and AFM) has prompted the design of arrays in which multiple probe tips scan in parallel [3–8]. With arrays, however, the problem of feedback becomes a difficult issue because parallel scanning requires each cantilever to have its own addressable feedback loop. Individual actuation of cantilevers has been explored, including piezoelectric films [3, 6] and thermal bimorphs [8]. While these approaches are effective for limited variations in topography, they do not easily accommodate samples with micro level topographical variation, such as integrated circuits or biological cells. Furthermore, all types of integrated actuators require additional fabrication steps, control circuitry, and electrical interconnect, thereby increasing manufacturing and calibration complexity.

SUMMARY OF THE INVENTION

An object of the present invention is to provide a relatively simple and inexpensive micromachined arrayed thermal probe apparatus, system for thermal scanning a sample in a contact mode and cantilevered reference probe for use therein.

In carrying out the above object and other objects of the present invention, a micromachined, arrayed thermal probe apparatus that can be scanned across a sample in a contact mode is provided. The apparatus includes a substrate, and an array of cantilevered probe segments supported on the substrate. Adjacent probe segments are substantially decoupled from each other. Each probe segment has a probe tip formed at a distal end thereof and each probe segment is ultracompliant to minimize contact force between its probe tip and the sample. A mechanism heats the probe tips and detects temperature variations during a scan.

The contact mode may be a non-feedback contact mode.

The apparatus may further include a common segment. Each of the probe segments may project from the common segment at its proximal end and may have a relatively low spring constant, and the common segment may have a relatively high spring constant.

The common segment may be bent over and secured back to itself to form an anchor for the probe segments.

The mechanism may include a thermal sensor formed at the distal end of each probe segment.

Each thermal sensor may include a thin-film resistor.

The thin-film resistor may be a thin-film metal resistor.

The mechanism may include at least one resistive conductor thermally connected to each of the probe tips.

Each of the probe segments may include at least one layer of flexible polymer over its at least one resistive conductor.

The layers of polymer may be formed of polyimide.

Further in carrying out the above object and other objects of the present invention, a system for thermal scanning a sample in a contact mode is provided. The system includes a motorized stage, a position controller for controlling position of the stage, and a micromachined arrayed thermal probe apparatus. The apparatus includes a substrate supported on the stage, and an array of cantilevered probe segments supported on the substrate. Adjacent probes are substantially decoupled from each other. Each probe segment has a probe tip formed at a distal end thereof and each probe segment is ultracompliant to minimize contact force between its probe tip and the sample. A mechanism has a resistance to heat the probe tips and detect temperature variations during a scan. An electrical circuit is coupled to the mechanism to provide bias current and sense changes in the resistance.

The stage may be an XY stage.

The mechanism may form a first portion of a bridge circuit, and the electrical circuit may include a second portion of the bridge circuit.

The contact mode may be a non-feedback contact mode.

The apparatus may further include a common segment supported on the substrate. Each of the probe segments may project from the common segment and may have a relatively low spring constant, and the common segment may have a relatively high spring constant.

The common segment may be bent over and secured back to itself to form an anchor for the probe segments.

The mechanism may include a thermal sensor formed at the distal end of each probe segment.

Each thermal sensor may include a thin-film resistor.

The thin-film resistor may be a thin-film metal resistor.

Still further in carrying out the above object and other objects of the present invention, a cantilevered reference probe comprising a probe segment and a probe tip formed at a distal end of the probe segment is provided. The probe segment is ultracompliant to minimize contact force between the probe tip and a sample. The probe segment includes a microfabricated thermal sensor coupled to the probe tip and a microfabricated reference sensor adjacent to the thermal sensor. Temperature difference between the two sensors is based on heat lost through the probe tip.

The probe tip may be shaped as an inverted pyramid.

Each of the sensors may include a thin-film resistor formed at the distal end of the probe segment.

Each of the thin-film resistors may be a thin-film metal resistor.

The thermal sensor may include a first pair of conductors thermally connected to the probe tip.

The reference sensor may include a second pair of conductors electrically connected in series to the first pair of conductors.

The probe segment may further include at least one layer of flexible polymer over the first and second pairs of conductors.

The layers of polymer may be formed of polyimide.

The sensors may be formed from a common metal layer.

The sensors may be microfabricated and positioned on the probe segment to experience substantially the same stress during bending of the probe segment.

The sensors may form a half bridge circuit.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

In general, the present invention relates to an ultracompliant probe apparatus that can be scanned across a sample with minimum force without mechanical feedback. The use of polyimide as the cantilever structural material offers not only a high thermal isolation, but a very high compliance [9], resulting in a 10–100× reduction in contact force over conventional materials like silicon and its dielectrics. Consequently, the contact force for each cantilever in the array remains low over a wide range of deflections, eliminating the need for probe level feedback typically required to prevent damage to the sample and the tip. In addition, the structure can be designed in a manner such that the cantilevers are decoupled both thermally and mechanically, enabling high-speed parallel thermal mapping of samples with large topographical variation using simple detection circuitry and no integrated actuators (FIG. 1).

More particularly, an 8-probe system for scanning thermal microscopy is provided. The design of the probe array, along with the choice of polyimide as the structural material, provides very large compliance that virtually eliminates the need for z-axis mechanical feedback both at the chip and probe level in contact mode scans. The high compliance accommodates significant variations in the sample surface, and also prevents damage to soft samples. In addition, since integrated actuators and accompanying circuitry are no longer required, the prospect of scaling to large numbers of probes for high speed, high resolution thermal mapping of large areas with simple detection circuitry is enhanced. Based on single probes fabricated in the same process, the estimated spatial resolution, thermal conductance resolution, and temperature resolution are 50 nm, 11 pW/K, and 1.2 mK, respectively. Contact mode scans can provide better than 2 µm spatial resolution at speeds greater than 200 µm/sec with each probe.

Device Structure and Operation

Figure 1:
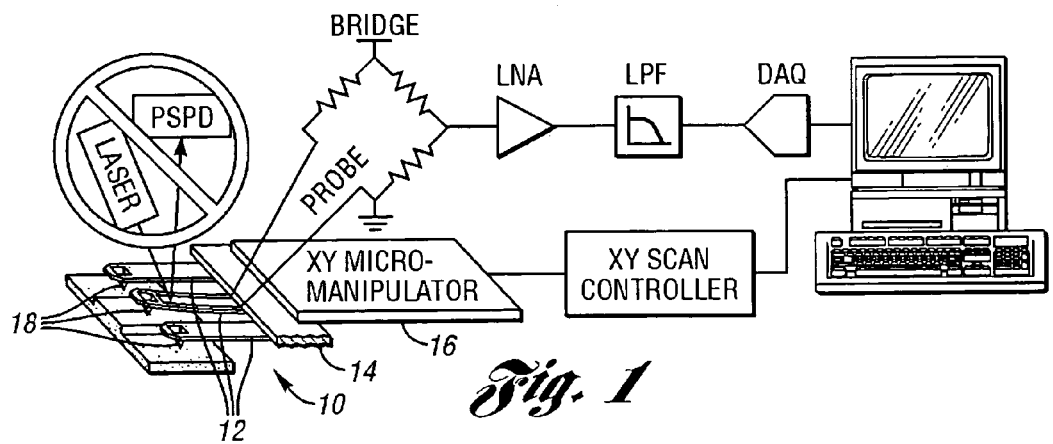
FIG. 1 is a schematic view of a system of the present invention wherein Z-axis feedback and integrated actuators are not required in the ultracompliant microprobe apparatus also of the present invention; a simple open loop interface circuit is sufficient to bias the probe tip temperature and read the temperature via changes in probe resistance.
Figure 2A:
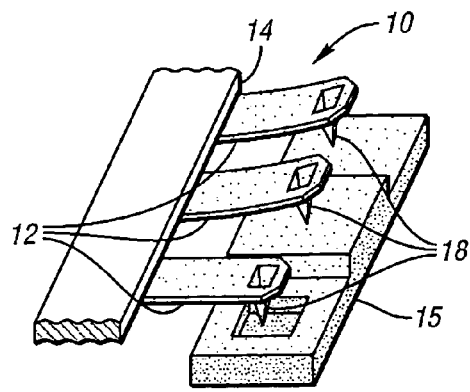
FIG. 2a is schematic view, partially broken away, of a thermal probe array of the present invention after assembly; individual probe segments or cantilevers protrude from a single common segment or shank; the figure shows the conceptual operation of the probe array over a sample with large topographic variation; each probe segment deflects vertically without affecting the other probe segments.

The structure of a probe apparatus, constructed in accordance with the present invention, is generally indicated at 10 in FIGS. 1 and 2a. Preferably, eight cantilevers or probe segments 12 extend off a single shank or common beam segment 14, overhanging from the edge of the die or substrate 24 as shown in FIG. 3g. To scan a sample 15, the die 24 is inverted and mounted on a motorized XY scanning stage 16 (FIG. 1). Each probe segment 12 in the apparatus 10 operates as a typical microbolometer. A thin metal resistor at a probe tip 18 is used to both heat the tip and detect temperature variations during the scan. The probe segments 12 are connected to a Wheatstone bridge that provides bias current and senses the changes in resistance. A low noise amplifier and low pass filter are used to minimize noise. A PC interface is used for data acquisition and to control the position of the XY scanning stage 16. As mentioned previously, the low spring constant of the polyimide probes, typically 10–100× lower than conventionally used, enables scanning most samples in non-feedback contact mode without damage.

Figure 2B:
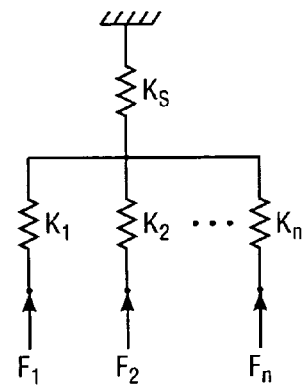
FIG. 2b is a view which illustrates a first order mechanical model of the array structure; for effective mechanical decoupling, the spring constant of the shank $K_S$ should be large compared to the cantilever spring constants $K_1$, $K_2$, etc.

Mechanical operation of the apparatus 10 is depicted in FIG. 2a. Ideally, each probe segment 12 deflects without affecting others. During fabrication however, since all the probe segments 12 are simultaneously flipped using the common segment 14 of the beam for handling, some degree of coupling is inevitable. Intuitively, the system can be thought of as a simple mechanical network shown in FIG. 2b, with an array of springs representing individual cantilevers or probe segments 12 coupled to a single spring representing the common beam segment 14. The precise value of mechanical cross-talk between beams or segments 12 depends on a number of factors, including the dimensions of the beam segments 12 and 14, the predeflection of the probe segments 12 in contact, and the magnitude of attractive surface forces that exist between each tip 18 and the sample 15. From the viewpoint of the designer, however, it is best to increase the lengths of the separated probe segments 12 and minimize that of the common segment 14.

Thermal coupling between adjacent probe segments 12 can be defined as $\Delta t_{P1}/\Delta t_{P2}$, i.e., the temperature shift in a probe segment 12 caused by a shift in the adjacent probe segment 12. Finite element analysis was conducted in ANSYS, ignoring convection and assuming that the apparatus 10 is held 15 µm above a thermally conductive substrate. The primary path of heat exchange between adjacent probe tips 18 was found to be lateral conduction through air, and the coupling rate is −24 dB. The factor improves by 10× if the distance between probe tips 18 is doubled to 170 µm.

Fabrication

The ultracompliant probe apparatus 10 may be fabricated in a low temperature 7-mask process suitable for post CMOS fabrication. Shown in FIGS. 3a–3g, the process consists primarily of surface micromachining with an additional thermocompression bonding step.

Figure 3A:
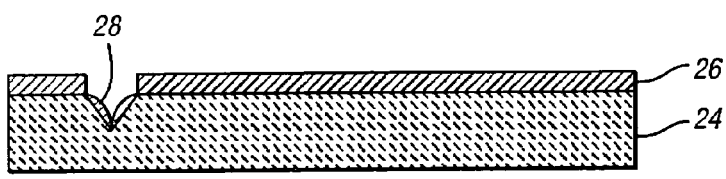
FIGS. 3a–3g are side sectional schematic views which illustrate the process flow for fabricating the polyimide-based, thermal probe apparatus, suitable for post-IC processing; a tip notch is created, followed by a sacrificial layer, a resistor sandwiched between two layers of polyimide, and a gold layer for thermo-compression bonding; after etching the sacrificial layer, the probe segments are flipped, resulting in probe segments overhanging the edge of the die.
Figure 3B:
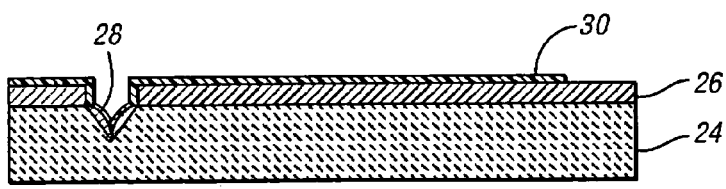
Figure 3C:
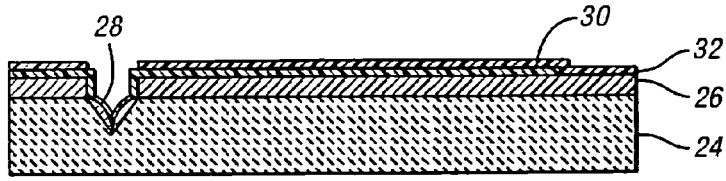
Figure 3D:
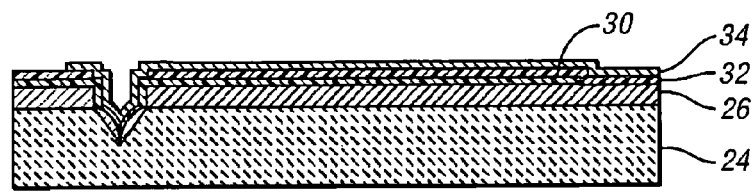
Figure 3E:
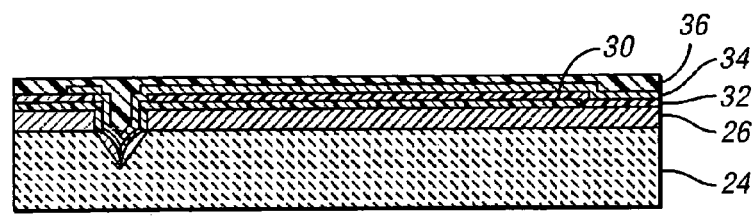
Figure 3F:
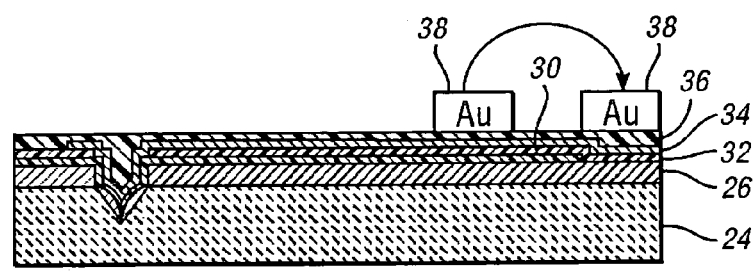
Figure 3G:
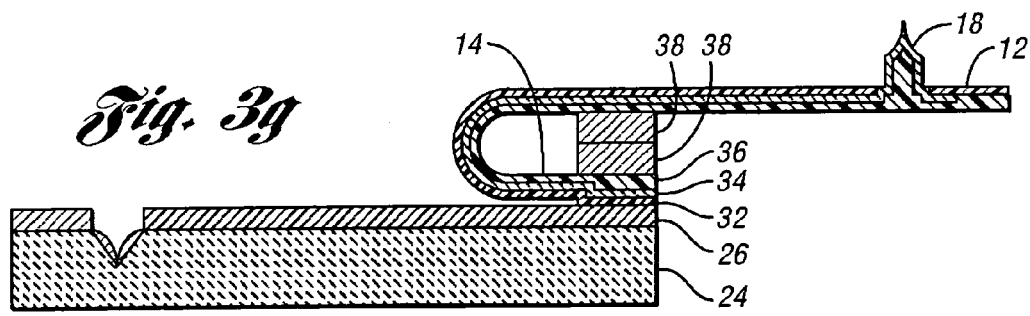

A mold for the tip structures 18 is first created by anisotropic etching of a silicon substrate 24 having a top silicon nitride layer 26 followed by an oxidation step for tip sharpening, as indicated at 28 in FIG. 3a. Sacrificial titanium 30 deposited below the cantilever structures facilitates release of the cantilevers 12 (FIG. 3b). Each cantilever 12 itself is formed by two polyimide layers (HD Microsystems P2613) with two metal layers embedded within. The first layer 32 of polyimide is etched from the tip region to permit the metal tip (to be formed next) to contact the sample (FIG. 3c). A thin metal layer 34 is then deposited in the mold to form both the metal tip 18 and the resistor. A second, thicker metal layer forms electrical interconnection to the probe tip (FIG. 3d). A top layer 36 of polyimide is used to insulate the metal and provide strength to the probe tip 18 (FIG. 3e). Thick gold patterns 38 are deposited after the second polyimide layer 36 for thermocompression bonding (FIG. 3f). After release of the cantilevers 12 in HF, the common probe shank 14 is flipped over and bonded at 200° C. (FIG. 3g), resulting in a probe shank 14 overhanging the edge of the wafter die 24 (FIG. 3g).

The structure and operation of some embodiments of the invention can be characterized as follows:

Structure:
 Array of probes for scanning thermal microscopy
  a. 1-D array;
  b. 2-D array;
  c. Multiple probes at arbitrary locations in a 2-D plane.

An array which is electrically insulated by a (polymer) coating on the scanning tips. This probe array requires no z-axis actuation. Prior art requires an external actuator to move the probe array or sample, or requires an embedded actuator to act on the probes individually or as a group.

The probe tips connect to the substrate through a pliable mechanism that permits the probe tips to deflect in a manner such as to follow the sample topography without causing damage to the sample.

Each probe tip connects to the substrate through a separate pliable mechanism that permits each probe tip to deflect individually without affecting the other probe tips.

The probe tips connect to the substrate through a pliable mechanism with a large (many micrometers) deflection range.

Each probe tip connects to the substrate through a separate pliable mechanism with a low thermal conductance to minimize the thermal cross-talk between probe tips.

In a preferred implementation, each probe shares a common electrical ground to minimize pin count.

Probes with a varying probe tip height may be co-fabricated on the same array.

Probes with a varying spring constant may be co-fabricated on the same array.

Operation:

The probes may be operated in an open-loop, parallel fashion whereby a constant voltage, current, or power is supplied to the probe tip and the change in resistance of each probe individually is measured indirectly through the supplied voltage and current.

The probes may be operated in a closed-loop, parallel fashion whereby the probe temperature is maintained constant by supplying the appropriate amount of power to keep the probe tip resistance constant. The output of each probe tip is the amount of power, voltage or current supplied.

The probe tips may be operated with a periodic voltage, current, or power superimposed on the signals going to the probe tips that are described above.

The periodic signal may be supplied from a single source and distributed to each probe, or generated independently for each probe.

The temperature of each probe may be independently set to perform a mapping function at a particular temperature bias.

The temperature of each probe may be independently ramped and the power required to raise the temperature monitored, so as to perform micro-calorimetry.

The structure of embodiments of the invention can also be characterized as follows:

A scanning thermal microscopy multi-probe, comprising:
 two or more cantilever beams, each beam having a microtip, which can either merge into one cantilever beam which extends from a planar substrate or separately extend from a planar substrate;
 a first mechanically-compliant insulating layer on the substrate and the cantilever beams;
 a first metal layer on the first insulating layer and on the substrate;

a second metal layer on the first metal layer and on the substrate;

either a resistive metal pattern for bolometer probe or a thermocouple junction over the microtip for thermocouple probe;

a second mechanically-compliant insulating layer on the first insulator layer and the first and second metal patterns;

a third metal for input and output pads and thermocompression bonding pads of the flipped-over cantilever beam and substrate, which can serve as an interconnection metal layer for electrical connection between probes.

A scanning thermal microscopy multi-probe, comprising one or more mechanically compliant suspensions attached to a relatively rigid structure or suspension housing two or more scan tips.

The structure, fabrication, principles of operation and applications of embodiments of the invention can further be characterized as follows:

Structure and Fabrication:
  Multiple cantilevers lined up in a one-dimensional array, connected to a common segment on the proximal end. The distal ends are free to move independently of one another. The entire structure is overhanging the edge of the substrate.
  The array structure is deposited and patterned on a substrate. Sacrificial etching is used to free the structure, and it is flipped 180° so that it overhangs the edge of the die. It is held in place by a gold-gold thermocompression bond.
  The structure could be extended to a two-dimensional array.
  Each cantilever is a flexible beam comprised of two layers of polyimide with a metal layer in between. The metal layer is patterned into a U-shaped path extending from the distal end to the cantilever all the way to the substrate.
  The distal end of the cantilever has metal probe tip shaped like an inverted pyramid, the sharp end of the pyramid facing away. Electrical current passing through the line heats the probe tip.
  Each of the probes in the array share a common ground, thereby reducing the number of contacts needed to the probe array.
  The common beam segment in the array is coated with reflective gold, for potential use in a laser feedback system. Alternatively, cantilevers could be individually coated for single probe feedback.

Principle of Operation:
  Multiple probe tips scanning simultaneously increase the overall throughput and decrease the amount of time required to image large areas.
  Passive decoupling: ability of each probe in the array to deflect independently of one another without the need for integrated actuator mechanisms.
  Each probe in the array is operated in non-feedback mode. No feedback required at the chip or probe level.
  Ultracompliant cantilevers provide a low contact force between the probe tip and the sample, preventing damage/wear to the sample and the tip. In addition, they allow imaging over a wide topographical range (up to 10 microns has been shown).

Applications:
  High throughput, parallel scanning of samples that are fragile and/or have large topographical variation. This can be done without laser feedback or integrated actuators.
  Metal lines on the cantilever are insulated, therefore enabling the possibility of scanning in a liquid environment.

Experimental Results and Discussion

To validate the functionality of the probe apparatus 10, a 750 μm×200 μm area was scanned on a commercial IC containing bond pads. Four of the eight probes 12 of the apparatus 10 were used, each generating a 200 μm×200 μm image consisting of 100 lines scanned at 25 μm/sec. Raw data was subject to standard signal processing to remove scan artifacts such as linear trends, and filter out high frequency noise. Scan results illustrate how a thermal image may be reconstructed by merging overlapping scan regions. All measurements made over the 2 μm of topographical variation were obtained without force feedback.

With throughput being the main motivation behind arrayed probes, it is of interest to gauge the scan speed at which features can be resolved. Two 7 μm deep anisotropically etched silicon trenches coated with polyimide and gold were scanned at increasing speeds. Line scans reveal an observable feature of about 2 μm can be resolved at speeds up to 200 μm/sec. (In fact, 10 μm features can be resolved even at 2 mm/sec.) The effective scan speed, which scales with the number of probe tips, is 1600 μm/sec for the 8 probe prototype. This suggests that a 1.5 mm×1.5 mm IC with 2 μm minimum features can be imaged in approximately 12 minutes. However, to put this in perspective, it is also necessary to consider dynamic range, because most high throughput micro-probe systems [4, 6] are not intended for mapping samples with wide surface variations.

Dynamic range and topographical resolution was demonstrated from line scans. Because this structure was coated with a thin gold layer of uniform thickness, it is expected that the thermal signal obtained will convey primarily topographical characteristics. The signal obtained is approximately linear with respect to topography. Using a 12 mA bias current, a 90 mV contrast was obtained over a 7 μm topographical variation, indicating a sensitivity of 12 mV/μm. Observed noise voltage is 1 mV, translating to a minimum detectable signal (MDS) of approximately 80 nm. The probe, therefore, permits scanning with a 6.5-bit resolution over a 7 μm dynamic range. This range is 10–100× higher than typical thermal probe arrays aimed at data storage applications.

Mechanical decoupling between adjacent probes was verified by imaging a via on a printed circuit board with a 6 μm depression simultaneously with two probes spaced 85 μm apart. Both probes obtain a thermal image independent of one another. Although the images are not identical (variation in tip resistance and tip wear can cause difference in the obtained signal), it is clear that the movement of probe 2 into the basin does not affect the signal or probe 1. The line scan as well as the two-dimensional maps support a strong degree of mechanical decoupling over a 6 μm topography.

Figure 4:
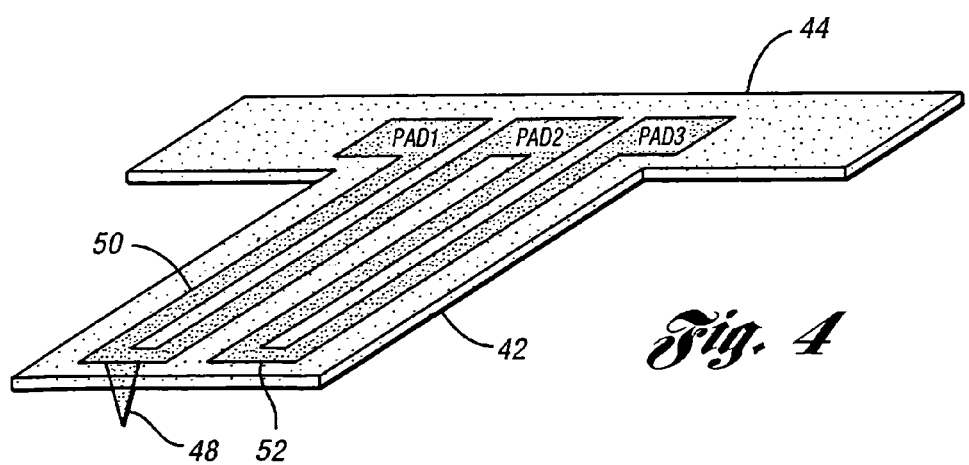
FIG. 4 is a perspective schematic view of a cantilevered reference probe having sense and reference resistors formed therein.

FIG. 4 shows a cantilevered reference probe including a probe segment 42 integrally formed with a common beam segment 44 at its proximal end. A probe tip 48 is formed at a distal end of the probe segment 42. A sense resistor 50 is electrically and thermally coupled to the probe tip 48 and to Pad 1 and to Pad 2. A reference resistor 52 is electrically connected to the sense resistor 50 between the Pad 2 and a Pad 3. Both resistors 50 and 52 are embedded in the probe segment 42 with the reference resistor 52 being adjacent the sense resistor 50 to provide a good reference.

The flexible cantilever beam segment 42 is comprised of two layers of polyimide with a metal layer in between. The metal layer is patterned into two paths, each forms a "u" shaped loop, the curved ends at the distal end of the probe. Therefore, there are four ends at the proximal end of the probe segment 42. The two middle paths are electrically connected to one another at Pad 2. The resistors 50 and 52 are also referred to as the first and second bolometers, respectively.

The curved end of the sensing bolometer 50 has an inverted pyramid referred to as the probe tip 48. The second metal loop (the reference bolometer 52), does not have a probe tip attached.

Principle of Operation:

The reference bolometer 52 is microfabricated directly on the cantilever. The structure of the reference bolometer 52 is identical to the first bolometer 50 with the exception of the absence of a probe tip.

Both resistors 50 and 52 are heated by passing the same electrical current through them. As the probe tip 48 is placed in contact with a sample, the temperature difference between the two bolometers 50 and 52 is due to the heat loss through the probe tip 48. In conventional thermal probes, heat lost through processes other than the probe tip (e.g., convection, backwards conduction through the probe shank) have a negative effect on the thermal signal obtained. This structure is designed to eliminate this problem.

The temperature difference is sensed using a Wheatstone bridge. The two bolometers 50 and 52, which can be considered two resistors, form half of the bridge, while two external resistors form the second half of the bridge.

Current is passed in series through the two bolometers 50 and 52 and the contact node between them (i.e., Pad 2) is used to sense the voltage.

The resistance of each bolometer is indicative of the temperature of each bolometer, and can also be affected by mechanical stresses when the cantilever is bent. Mechanical stresses in the beam segment 42 affect the resistance of both bolometers 50 and 52 equally, therefore no distortion or noise in the thermal signal.

In thermal microscopy, the heat conduction from the probe tip to the sample must be the dominant heat transfer process, while other processes (e.g., convection, backwards conduction through the probe shank) reduce sensitivity and increase the noise in a thermal probe. Because both bolometers 50 and 52 are fabricated on the same cantilever or beam segment 42, these non-ideal heat transfer processes affect both bolometers 50 and 52 equally, and therefore sensing the temperature difference between the two bolometers 50 and 52, alleviates or eliminates the negative affects of these processes.

The differential nature of this thermal probe design also alleviates or eliminates other sources of noise or distortion common to both bolometers 50 and 52. These may include heating by ambient light, cooling by convectional currents, Brownian noise, and mechanical stresses in the bolometers 50 and 52 caused by the bending of the cantilever beam segment 42.

Using the two bolometers 50 and 52 in series to form a half bridge which enables a Kelvin type measurement of the resistance, two contacts (i.e., Pad 1 and Pad 3) are used to pass a fixed current through both probes in series, and the middle contact (i.e., Pad 2) can be used to sense voltage.

Application:

Metal lines on the cantilever beam segment 42 are insulated, therefore enabling the possibility of scanning in a liquid environment. As mentioned above, non-desirable conductive/convective heat losses can be a major problem, especially when scanning in liquid environments where the thermal conductivity of the medium is higher than air. The differential scheme alleviates the effect of such heat losses, and therefore can enable scanning in liquid mediums.

Mechanical resonance of a cantilever beam segment 42 can cause undesirable vibrations when scanning at high speeds. The effect of these vibrations is alleviated or eliminated, and therefore can enhance the ability to perform high speed scanning.

CONCLUSIONS

The mechanically decoupled 8-probe array can be used for parallel, high-resolution thermal mapping of features with large topographical variation without force feedback. Elimination of feedback is enabled by using ultracompliant probes that minimize contact force, preventing damage to both the tip and fragile samples. In non-feedback mode, 2 µm lateral features were resolved at speeds up to 200 µm/sec per probe, and 10 µm features can be resolved even at 2 mm/sec. Noise limited minimum detectable signal (MDS) for topographical variations was found to be 80 nm, and the dynamic range is >7 µm. If feedback is used, single probe versions developed previously by the same technology [9] obtain an MDS of 1 nm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A micromachined, arrayed thermal probe apparatus that can be scanned across a sample in a contact mode, the apparatus comprising:

a substrate;

an array of cantilevered probe segments supported on the substrate wherein adjacent probe segments are substantially decoupled from each other and wherein each probe segment has a probe tip formed at a distal end thereof and wherein each probe segment is compliant to minimize contact force between its probe tip and the sample;

a mechanism to heat the probe tips and detect temperature variations at the probe tip during a scan; and a common segment supported on the substrate wherein each of the probe segments projects from the common segment at its proximal end and wherein the common segment is bent over and secured back to itself to form an anchor for the probe segments.

2. The apparatus as claimed in claim 1, wherein the contact mode is a non-feedback contact mode.

3. The apparatus as claimed in claim 1, wherein each of the probe segments has a relatively low spring constant and wherein the common segment has a relatively high spring constant.

4. The apparatus as claimed in claim 1, wherein the mechanism includes a thermal sensor formed at the distal end of each probe segment.

5. The apparatus as claimed in claim 4, wherein each thermal sensor includes a thin-film resistor.

6. The apparatus as claimed in claim 5, wherein the thin-film resistor is a thin-film metal resistor.

7. A micromachined, arrayed thermal probe apparatus that can be scanned across a sample in a contact mode, the apparatus comprising:
   a substrate;
   an array of cantilevered probe segments supported on the substrate wherein adjacent probe segments are substantially decoupled from each other and wherein each probe segment has a probe tip formed at a distal end thereof and wherein each probe segment is compliant to minimize contact force between its probe tip and the sample; and
   a mechanism to heat the probe tips and detect temperature variations at the probe tip during a scan wherein the mechanism includes at least one resistive conductor thermally connected to each of the probe tips and wherein each of the probe segments includes at least one layer of flexible polymer over its at least one resistive conductor.

8. The apparatus as claimed in claim 7, wherein the layers of polymer are formed of polyimide.

9. A system for thermal scanning a sample in a contact mode, the system comprising:
   a motorized stage;
   a position controller for controlling position of the stage;
   a micromachined arrayed thermal probe apparatus, the apparatus including a substrate supported on the stage and an array of cantilevered probe segments supported on the substrate wherein adjacent probes are substantially decoupled from each other, each probe segment having a probe tip formed at a distal end thereof and wherein each probe segment is compliant to minimize contact force between its probe tip and the sample, a mechanism having a resistance to heat the probe tips and detect temperature variations at the probe tip during a scan and a common segment supported on the substrate and wherein each of the probe segments projects from the common segment at its proximal end; and wherein the common segment is bent over and secured back to itself to form an anchor for the probe segments; and
   an electrical circuit coupled to the mechanism to provide bias current and sense changes in the resistance.

10. The system as claimed in claim 9, wherein the stage is an XY stage.

11. The system as claimed in claim 9, wherein the mechanism forms a first portion of a bridge circuit and wherein the electrical circuit includes a second portion of the bridge circuit.

12. The system as claimed in claim 9, wherein the contact mode is a non-feedback contact mode.

13. The system as claimed in claim 9, wherein each of the probe segments has a relatively low spring constant and wherein the common segment has a relatively high spring constant.

14. The system as claimed in claim 9, wherein the mechanism includes a thermal sensor formed at the distal end of each probe segment.

15. The system as claimed in claim 14, wherein each thermal sensor includes a thin-film resistor.

16. The system as claimed in claim 15, wherein the thin-film resistor is a thin-film metal resistor.

\* \* \* \* \*